US012392003B2

(12) United States Patent
Lee

(10) Patent No.: US 12,392,003 B2
(45) Date of Patent: *Aug. 19, 2025

(54) DOUBLY ORIENTED ELECTRICAL STEEL SHEET AND MANUFACTURING METHOD THEREFOR

(71) Applicant: POSCO, Pohang-si (KR)

(72) Inventor: Seil Lee, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 795 days.

This patent is subject to a terminal disclaimer.

(21) Appl. No.: 17/280,731

(22) PCT Filed: Sep. 25, 2019

(86) PCT No.: PCT/KR2019/012471

§ 371 (c)(1),
(2) Date: Mar. 26, 2021

(87) PCT Pub. No.: WO2020/067721

PCT Pub. Date: Apr. 2, 2020

(65) Prior Publication Data

US 2021/0381073 A1 Dec. 9, 2021

(30) Foreign Application Priority Data

Sep. 27, 2018 (KR) ........................ 10-2018-0115267

(51) Int. Cl.
*C22C 38/00* (2006.01)
*C21D 6/00* (2006.01)
(Continued)

(52) U.S. Cl.
CPC ............... *C21D 9/46* (2013.01); *C21D 6/005* (2013.01); *C21D 6/008* (2013.01); *C21D 8/1222* (2013.01);
(Continued)

(58) Field of Classification Search
CPC ..... C22C 38/00; C22C 38/001; C22C 38/002; C22C 38/004; C22C 38/008; C22C 38/02;
(Continued)

(56) References Cited

U.S. PATENT DOCUMENTS 3,078,198 A 2/1963 Wiener
5,714,017 A * 2/1998 Tomida .............. H01F 1/14775 148/308
(Continued)

FOREIGN PATENT DOCUMENTS

JP H08-243700 A 9/1996
JP 2005-179745 A 7/2005
(Continued)

OTHER PUBLICATIONS

Written Opinion and International Search Report dated Jan. 14, 2020 issued in International Patent Application No. PCT/KR2019/012471 (with partial English translation).
(Continued)

*Primary Examiner* — Vanessa T. Luk
(74) *Attorney, Agent, or Firm* — Morgan, Lewis & Bockius LLP

(57) ABSTRACT

A double oriented electrical steel sheet according to an embodiment of the present invention includes: in wt %, Si at 2.0 to 4.0 wt %, Al at 0.01 to 0.04 wt %, S at 0.0004 to 0.002 at %, Mn at 0.05 to 0.3 wt %, N at 0.008 wt % or less (excluding 0 wt %), C at 0.005 wt % or less (excluding 0 wt %), P at 0.005 to 0.15 wt %, Ca at 0.0001 to 0.005 wt %, Mg at 0.0001 to 0.005 wt %, and the balance including Fe and other impurities unavoidably added thereto.

10 Claims, 2 Drawing Sheets

(51) Int. Cl.

| | |
|---|---|
| ***C21D 8/12*** | (2006.01) |
| ***C21D 9/46*** | (2006.01) |
| ***C22C 38/02*** | (2006.01) |
| ***C22C 38/04*** | (2006.01) |
| ***C22C 38/06*** | (2006.01) |
| ***C22C 38/12*** | (2006.01) |
| ***C22C 38/14*** | (2006.01) |
| ***C22C 38/60*** | (2006.01) |
| ***H01F 1/147*** | (2006.01) |

(52) U.S. Cl.

CPC ......... *C21D 8/1233* (2013.01); *C21D 8/1272* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/12* (2013.01); *C22C 38/14* (2013.01); *C22C 38/60* (2013.01); *H01F 1/147* (2013.01); *C21D 2201/05* (2013.01); *C22C 2202/02* (2013.01)

(58) Field of Classification Search

CPC ......... C22C 38/04; C22C 38/06; C22C 38/12; C22C 38/14; C22C 38/60; C22C 2202/02; C21D 8/12; C21D 2201/05; H01F 1/12; H01F 1/14; H01F 1/147; H01F 1/14766; H01F 1/14775; H01F 1/14783; H01F 1/14791; H01F 1/16; H01F 1/18

See application file for complete search history.

(56) References Cited

U.S. PATENT DOCUMENTS

| | | | | | |
|---|---|---|---|---|---|
| 5,948,180 | A * | 9/1999 | Tomida | C21D 8/12 | 310/216.006 |
| 6,562,473 | B1 * | 5/2003 | Okabe | H01F 1/14775 | 148/310 |
| 11,802,319 | B2 * | 10/2023 | Lee | C22C 38/02 | |
| 2003/0175524 | A1 * | 9/2003 | Sashi | C22C 38/02 | 428/421 |
| 2005/0126659 | A1 * | 6/2005 | Homma | H01F 41/0206 | 148/307 |
| 2009/0202383 | A1 * | 8/2009 | Tanaka | C22C 38/004 | 148/624 |
| 2015/0255211 | A1 | 9/2015 | Shen et al. | | |
| 2018/0002772 | A1 | 1/2018 | Han et al. | | |
| 2021/0054474 | A1 * | 2/2021 | Lee | C21D 8/1272 | |

FOREIGN PATENT DOCUMENTS

| | | | | | |
|---|---|---|---|---|---|
| JP | 2006-241503 | A | | 9/2006 | |
| JP | 2008-106367 | A | | 5/2008 | |
| JP | 4277432 | B2 | | 6/2009 | |
| JP | 4593317 | B2 | | 12/2010 | |
| JP | 4826312 | B2 | | 11/2011 | |
| JP | 2012-126980 | A | | 7/2012 | |
| JP | 2013-060653 | A | | 4/2013 | |
| JP | 2014-196559 | A | | 10/2014 | |
| JP | 2017-122269 | A | | 7/2017 | |
| KR | 1020150073796 | A | * | 7/2015 | C21D 8/12 |
| KR | 10-2018-0071112 | A | | 6/2018 | |
| KR | 10-2018-0073323 | A | | 7/2018 | |
| WO | 2018/056379 | A1 | | 3/2018 | |
| WO | 2018/117638 | A1 | | 6/2018 | |
| WO | WO-2019132363 | A1 | * | 7/2019 | C21D 3/04 |

OTHER PUBLICATIONS

Japanese Office Action dated Apr. 26, 2022 issued in Japanese Patent Application No. 2021-517630.

Extended European Search Report dated Oct. 27, 2021 issued in European Patent Application No. 19866768.5.

* cited by examiner

DOUBLY ORIENTED ELECTRICAL STEEL SHEET AND MANUFACTURING METHOD THEREFOR

CROSS-REFERENCE OF RELATED APPLICATIONS

This application is the U.S. National Phase under 35 U.S.C. § 371 of International Patent Application No. PCT/KR2019/012471, filed on Sep. 25, 2019, which in turn claims the benefit of Korean Application No. 10-2018-0115267, filed on Sep. 27, 2018, the entire disclosures of which applications are incorporated by reference herein.

TECHNICAL FIELD

An embodiment of the present invention relates to a double oriented electrical steel sheet and a manufacturing method thereof. Specifically, an embodiment of the present invention relates to a double oriented electrical steel sheet and a manufacturing method thereof that may have very excellent magnetism in a rolling direction and a transverse direction by appropriately controlling contents of Mg and Ca in an alloy composition to increase a fraction of grains having an orientation of {110}<001>.

BACKGROUND ART

A method for increasing magnetic flux density of an electrical steel sheet is improving texture of a steel and arranging an axis of <100> in a magnetization direction is known to be the most efficient. In addition, an additional method in use is reducing an alloy amount of the steel to increase a fraction for Fe to occupy the steel, and allowing a saturated magnetic flux to approach that of pure iron to thus increase the magnetic flux density. An oriented electrical steel sheet among them uses an orientation of {110}<001> that is referred to as a Goss orientation, and it is conventionally obtained through a process of manufacturing a slab, and hot rolling, hot-rolled steel sheet annealing, cold rolling, decarburization during first recrystallization, nitriding, and secondary high-temperature annealing. However, this has excellent magnetism in the rolling direction (RD) and very poor magnetism in the transverse direction (TD), so it is only usable for a transformer of which the magnetization direction is set to be the rolling direction. Therefore, it is required to manufacture an electrical steel sheet for controlling texture in parallel to the magnetization direction and the axis of <100> with different texture.

The magnetization direction of a rotation device conventionally rotates in the sheet, so the axis of <100> must be parallel to the sheet, and a frequently observed orientation from a steel material from among the orientations in such a condition is the orientation of {100}<011>. The axis of <100> is parallel to a direction that is inclined in a transverse direction (TD) from the rolling direction by 45 degrees, so the magnetism is excellent when the magnetization direction is inclined from the rolling direction of the sheet by 45 degrees. However, this orientation disappears in the case of a recrystallization annealing with a cold-rolling stable orientation, so it is not used as an electrical steel sheet material.

In a like manner, there is an orientation of {100}<001>, and this is a cube on face orientation of which usefulness has been acclaimed in the past, but a method for manufacturing it through a device allows no massive industrial production such as performing cross rolling or vacuum annealing.

Particularly, the cross-rolling method may not be used such that continuous production of a material is impossible, and in the case of a large generator, a core in a cylindrical form of several meters must be manufactured, so it may not be applicable to a process for dividing the core into several to several tens and assembling them on the sheet, and productivity is severely lowered.

In the case of generators, a general turbine generator generates electricity according to commercial electrical frequencies of respective countries such as 50 Hz or 60 Hz, so the magnetic property at 50 Hz and 60 Hz is important, but in the case of a generator with a slow rotation rate such as wind power generators, the magnetic characteristic with a DC and at 30 Hz or below is important.

Therefore, regarding the above-noted devices, the characteristic of the magnetic flux density indicating a degree of magnetization is more important than the iron loss generated in AC magnetism, and it is generally estimated with magnetic flux density of B8. The magnetic flux density of B8 represents a magnetic flux density value of a steel sheet when intensity of a magnetic field is 800 A/m, it is mainly measured at the AC magnetism of 50 Hz, and depending on cases, it may be measured at the DC or at the frequency of 50 Hz or less.

DISCLOSURE

An embodiment of the present invention provides a double oriented electrical steel sheet and a manufacturing method thereof. Specifically, an embodiment of the present invention provides a double oriented electrical steel sheet and a manufacturing method thereof that may have very excellent magnetism in a rolling direction and a transverse direction by appropriately controlling contents of Mg and Ca in an alloy composition to increase a fraction of grains having an orientation of {110}<001>.

A double oriented electrical steel sheet according to an embodiment of the present invention includes: in wt %, Si at 2.0 to 4.0 wt %, Al at 0.01 to 0.04 wt %, S at 0.0004 to 0.002 at %, Mn at 0.05 to 0.3 wt %, N at 0.008 wt % or less (excluding 0 wt %), C at 0.005 wt % or less (excluding 0 wt %), P at 0.005 to 0.15 wt %, Ca at 0.0001 to 0.005 wt %, Mg at 0.0001 to 0.005 wt %, and the balance including Fe and other impurities unavoidably added thereto.

The double oriented electrical steel sheet may satisfy Formula 1 below.

$$[Ca]+[Mg]\geq[S] \quad \text{[Formula 1]}$$

(In Formula 1, [Ca], [Mn], and [S] represent contents (wt %) of Ca, Mn, and S, respectively.)

The double oriented electrical steel sheet may further include one or more of Sb at 0.001 to 0.1 wt % and Sn at 0.001 to 0.1 wt %.

The double oriented electrical steel sheet may further include one or more of Ti at 0.01 wt % or less, Mo at 0.01 wt % or less, Bi at 0.01 wt % or less, Pb at 0.01 wt % or less, As at 0.01 wt % or less, Be at 0.01 wt % or less, and Sr at 0.01 wt % or less.

An area fraction of a grain with an orientation within 15° may be 60 to 99% from {100}<001>.

An average grain size may be 20 times or more a thickness of the steel sheet.

An oxide layer formed from a surface of a substrate of the steel sheet in a direction inside the substrate and an insulating layer formed on the surface of the substrate may be included.

A thickness of the oxide layer may be 5 μm or less.

A thickness of the insulating layer may be 0.2 to 8 μm.

The double oriented electrical steel sheet may further include a forsterite layer interposed between the surface of the substrate and the insulating layer.

Br in a rolling direction and Br in a transverse direction may be equal to or larger than 1.63 T, Br in a circumferential direction may be equal to or larger than 1.56 T, and the Br may be calculated by Formula 2.

A Br value measured after annealing the steel sheet at a temperature of 750° C. to 880° C. for 1 to 2 hours may be equal to or larger than 1.65 T, and the Br may be calculated by Formula 2.

A manufacturing method of a double oriented electrical steel sheet according to an embodiment of the present invention includes: manufacturing a slab including: in wt %, Si at 2.0 to 4.0 wt %, Al at 0.01 to 0.04 wt %, S at 0.0004 to 0.002 at %, Mn at 0.05 to 0.3 wt %, N at 0.02 wt % or less (excluding 0 wt %), C at 0.05 wt % or less (excluding 0 wt %), P at 0.005 to 0.15 wt %, Ca at 0.0001 to 0.005 wt %, Mg at 0.0001 to 0.005 wt %, and the balance including Fe and other impurities unavoidably added thereto; hot-rolling the slab to manufacture a hot-rolled sheet; cold-rolling the hot-rolled sheet to produce a cold-rolled sheet; primary-recrystallization-annealing the cold-rolled sheet; and secondary-recrystallization-annealing the cold-rolled sheet undergoing the primary-recrystallization-annealing.

The slab may satisfy Formula 3 below.

$$[C]/[Si] \geq 0.0067 \qquad \text{[Formula 3]}$$

(In Formula 3, [C] and [Si] are contents (wt %) of C and Si in the slab, respectively.)

The manufacturing of the hot-rolled sheet may include rough-rolling the slab, heating the rough-rolled bar, and strip milling the heated bar, and the heating of the bar may be maintaining at a temperature of 1100° C. or higher for 30 seconds to 20 minutes.

The primary-recrystallization-annealing may include decarburizing at a dew point temperature of 50 to 70° C.

The primary-recrystallization-annealing may include nitriding, and a nitriding amount may be 0.01 to 0.03 wt %.

After the primary-recrystallization-annealing, an average grain size of a steel sheet undergoing the primary-recrystallization-annealing may be 30 to 50 μm.

The manufacturing method of the double oriented electrical steel sheet may further include, after the primary-recrystallization-annealing, applying an annealing separator.

The manufacturing method of the double oriented electrical steel sheet may further include, after the secondary-recrystallization-annealing, removing a forsterite layer formed on a surface of the steel sheet.

The double oriented electrical steel sheet according to the embodiment of the present invention has excellent magnetism in a rolling direction and a transverse direction by appropriately controlling contents of Mg and Ca in an alloy composition.

Particularly, the double oriented electrical steel sheet according to the embodiment of the present invention may be usefully used for a generator with a slow rotational speed such as a wind power generator.

MODE FOR INVENTION

Figure 1:
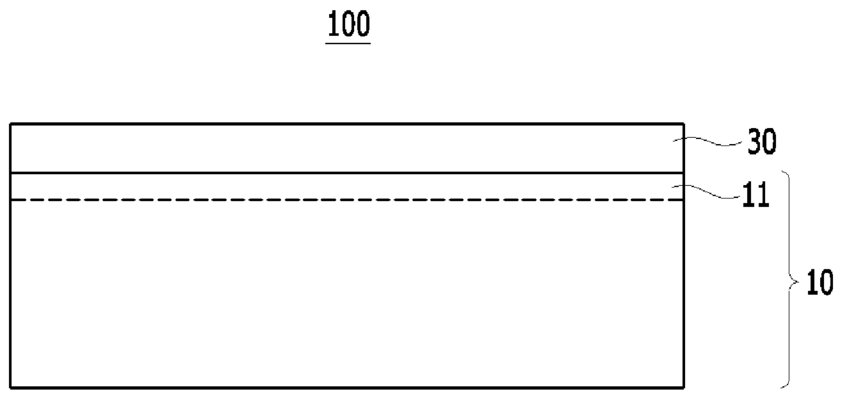
FIG. 1 illustrates a schematic view of a cross-section of a double oriented electrical steel sheet according to an embodiment of the present invention.

It will be understood that, although the terms first, second, third, etc. may be used herein to describe various elements, components, regions, layers, and/or sections, they are not limited thereto. These terms are only used to distinguish one element, component, region, layer, or section from another element, component, region, layer, or section. Therefore, a first part, component, area, layer, or section to be described below may be referred to as second part, component, area, layer, or section within the range of the present invention.

The technical terms used herein are to simply mention a particular embodiment and are not meant to limit the present invention. An expression used in the singular encompasses an expression of the plural, unless it has a clearly different meaning in the context. In the specification, it is to be understood that the terms such as "including", "having", etc., are intended to indicate the existence of specific features, regions, numbers, stages, operations, elements, components, and/or combinations thereof disclosed in the specification, and are not intended to preclude the possibility that one or more other features, regions, numbers, stages, operations, elements, components, and/or combinations thereof may exist or may be added.

When referring to a part as being "on" or "above" another part, it may be positioned directly on or above another part, or another part may be interposed therebetween. In contrast, when referring to a part being "directly above" another part, no other part is interposed therebetween.

Unless otherwise defined, all terms used herein, including technical or scientific terms, have the same meanings as those generally understood by those with ordinary knowledge in the field of art to which the present invention belongs. Terms defined in commonly used dictionaries are further interpreted as having meanings consistent with the relevant technical literature and the present disclosure, and are not to be construed as having idealized or very formal meanings unless defined otherwise.

Unless otherwise stated, % means % by weight, and 1 ppm is 0.0001% by weight.

In embodiments of the present invention, inclusion of an additional element means replacing the remaining iron (Fe) by an additional amount of the additional elements.

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

A double oriented electrical steel sheet according to an embodiment of the present invention includes: in wt %, Si at 2.0 to 4.0 wt %, Al at 0.01 to 0.04 wt %, S at 0.0004 to 0.002 at %, Mn at 0.05 to 0.3 wt %, N at 0.008 wt % or less (excluding 0 wt %), C at 0.005 wt % or less (excluding 0 wt %), P at 0.005 to 0.15 wt %, Ca at 0.0001 to 0.005 wt %, Mg at 0.0001 to 0.005 wt %, and the balance including Fe and other impurities unavoidably added thereto.

First, the reason for limiting the components of the double oriented electrical steel sheet will be described.

Si at 2.0 to 4.0 wt %

The silicon (Si) is an element for forming austenite during hot rolling, and it is needed to limit an added amount thereof so that it may have an austenite fraction of around 10% at about a slab heating temperature and about a hot-rolled steel sheet annealing temperature. In the secondary-recrystallization-annealing, formation of secondary recrystallization microstructures may be fluently generated at the time of annealing in the case of a single phase of ferrite, so it is needed to limit the component that becomes the single phase of ferrite. A single phase of ferrite is formed by adding 2.0 wt % or more with respect to pure iron, and a fraction of austenite may be controlled by an addition of C, so a lower limit of the content of Si may be 2.0 wt %. In addition, when it exceeds 4 wt %, cold rolling is difficult and a saturation magnetic flux deteriorates, so is limited. Specifically, Si may be included in an amount of 2.2 to 3.3 wt %. More specifically, Si may be included in an amount of 2.4 to 2.9 wt % so as to obtain the steel sheet with high magnetic flux density.

Al at 0.01 to 0.04 wt %

The aluminum (Al) forms an AlN and is used as an inhibitor of secondary recrystallization. In an exemplary embodiment of the present invention, cube texture may be obtained in use of the inhibitor other than a nitriding process of the conventional oriented electrical steel sheet, so the added amount of Al may be controlled in a wider range than that of the conventional oriented electrical steel sheet. Here, when added at less than 0.01 wt %, an oxide of the steel substantially increases to deteriorate magnetism, and changes the temperature of secondary recrystallization to hinder formation of the cube orientation, so it limit is set to be 0.01 wt %. When greater than 0.04 wt %, the temperature of secondary recrystallization substantially increases, so its industrial production becomes difficult. Specifically, Al may be included in an amount of 0.015 to 0.035 wt %.

S at 0.0004 to 0.002 wt %

The sulfur (S) is combined to Cu or Mn in the steel to finely form MnS, and finely formed precipitates support the secondary recrystallization, so its added amount may be 0.0004 to 0.002 wt %. When S is added in an excessive amount, a fraction of Goss in the steel may increase during the secondary recrystallization due to segregation of S, and the precipitates in the hot-rolled sheet are not controlled, so that a desired texture at the time of secondary recrystallization may not be obtained. Specifically, S may be included in an amount of 0.0005 to 0.001 wt %.

Mn at 0.05 to 0.3 wt %

The manganese (Mn) unavoidably exists in the molten steel, but when a small amount thereof is supplied, it may be used as precipitates, and it may be added in the steel as an element changing into MnS after formation of FeS. However, when too much is added, even during high temperature annealing, Mn maintains a strong bond with S, preventing the bonding between Mg and Ca, and S that forms fine precipitates. Conversely, when too little is added, it may be difficult to control the texture during the secondary recrystallization. Accordingly, Mn may be included in an amount of 0.05 to 0.3 wt %. More specifically, Mn may be included in an amount of 0.08 to 0.2 wt %.

N at 0.008 wt % or Less

The nitrogen (N) is an element for forming the AlN, it uses the AlN as an inhibitor, so an appropriate content may need to be acquired. When a very small amount of N is contained, a non-uniform deformation degree of texture at the time of cold rolling may be sufficiently increased to thus fail to promote growth of the cube and suppress growth of Goss at the first recrystallization. When a very large amount of N is contained, a surface defect such as a blister caused by nitrogen diffusion in a process following the hot rolling process may occur, and excessive nitride is formed in a hot-rolled steel sheet state, so rolling is not easy and a production cost may increase. Specifically, N may be contained in an amount of 0.005 wt % or less in the electrical steel sheet.

N may be contained in an amount of 0.02 wt % or less in the slab. In an embodiment of the present invention, a nitriding process is included when primary-recrystallization-annealing is performed, but when it is added in an amount of 0.01 wt % to 0.02 wt % in the hot-rolled steel sheet, an inhibitor may be sufficiently made even if the nitriding process is omitted. Some of N is removed in the secondary-recrystallization-annealing process, so the contents of N of the slab and the finally manufactured electrical steel sheet may be different from each other.

C at 0.005 wt % or Less

When a large amount of carbon (C) is added after the secondary-recrystallization-annealing is performed, magnetic aging is generated and the iron loss substantially increases, so the upper limit is set to be 0.005 wt %. More specifically, C may be contained in an amount of 0.0001 to 0.005 wt %.

C may be contained in an amount of 0.05 wt % or less in the slab. Through this, it becomes possible to suppress concentration of stress and formation of Goss in the hot-rolled steel sheet, and generate fine precipitates. In addition, C may increase a texture non-uniform deformation degree during cold rolling to promote growth of cube and suppress growth of Goss at the first recrystallization. When a large amount thereof is added, the concentration of stress in the hot-rolled steel sheet may be eased but the formation of Goss may not be suppressed, and it is difficult to generate fine precipitates. It substantially deteriorates the cold rolling property during cold rolling, so the added amount is limited. In the embodiment of the present invention, a decarburization process is included in the primary-recrystallization-annealing, so the contents of C of the slab and the finally manufactured electrical steel sheet may be different from each other.

The contents of C and Si in the slab may satisfy Formula 3.

$$[C]/[Si] \geq 0.0067 \qquad \text{[Formula 3]}$$

(In Formula 3, [C] and [Si] are contents (wt %) of C and Si in the slab, respectively.)

When a very small amount of C is contained or a very large amount of Si is contained, it may become difficult to promote growth of cubes and suppress growth of Goss. Specifically, the left side of Formula 3 may be 0.0083 or more.

P at 0.005 to 0.15 wt %

The phosphorus (P) improves specific resistance of the steel, increases a cube fraction at the secondary recrystallization, and increases non-uniform deformation at the time of a cold rolling, so it is preferable to add at least 0.005 wt %. However, when added in excess of 0.15 wt %, the cold rolling property becomes very weak, so the added amount is limited. More specifically, S may be contained in an amount of 0.01 to 0.08 wt %.

Ca at 0.0001 to 0.005 wt % and Mg at 0.0001 to 0.005 wt %

Both the calcium (Ca) and the magnesium (Mg) are alloy elements with excellent reactivity in steel, and even when added in small amounts, they significantly influence the properties of the steel. In the steel in which S is added in an appropriate amount, Ca and Mg are combined with S to form fine sulfides at a high temperature. Since it is stable even at a low temperature, when such a fine precipitate is formed on a hot-rolled sheet, it serves as an inhibitor for controlling texture during the secondary recrystallization. However, when Ca and Mg are added in an excessive amount, they are also combined with oxygen in the steel to form an oxide, and this oxide may cause surface defects and magnetic defects. Thus, Ca is contained in an amount of 0.0001 to 0.005 wt %, and Mg is contained in an amount of 0.0001 to 0.005 wt %. More specifically, Ca is contained in an amount of 0.001 to 0.003 wt %, and Mg is contained in an amount of 0.0005 to 0.0025 wt %.

The double oriented electrical steel sheet according to the embodiment of the present invention may satisfy Formula 1 below.

$$[Ca]+[Mg]\geq[S] \quad \text{[Formula 1]}$$

(In Formula 1, [Ca], [Mn], and [S] represent contents (wt %) of Ca, Mn, and S, respectively.)

Ca and Mg, when combined with S to become fine sulfides, may play a role as inhibitors during the secondary recrystallization. For the role of the inhibitor, a sufficient amount thereof should be positioned with an appropriate size and a small deviation of distribution. Since S is a segregation element, when the content of S is larger than a sum of the contents of Ca and Mg, fine precipitates are mainly distributed on a surface or a hot-rolled grain boundary, which makes the role of the inhibitor of the secondary recrystallization of an adjacent orientation of the cube unsuitable. On the other hand, Ca and Mg are not segregation elements, so they are evenly distributed regardless of their position in the steel. Therefore, it is preferable that the content of S is smaller than the sum of the contents of Ca and Mg. It is more preferable that the content of S is smaller than half of the sum of the contents of Ca and Mg. That is, it is preferable that $[Ca]+[Mg]\geq 2\times[S]$.

One or More of Sb at 0.001 to 0.1 wt % and Sn at 0.001 to 0.1 wt %

The tin (Sn) and the antimony (Sb) are elements that may be added to control the first recrystallization texture. In addition, they are elements that reduce a magnetism difference between the transverse direction and the rolling direction by changing a formation thickness of an oxide layer, while when added in excess of 0.1 wt %, slip in the roll significantly increases during the cold rolling, so they are limited. More specifically, one or more of Sb at 0.005 to 0.05 wt % and Sn at 0.005 to 0.05 wt % may be contained.

As described above, when the additional elements are contained, they replace the balance Fe. For example, the double oriented electrical steel sheet further including Sb at 0.001 to 0.1 wt % includes: in wt %, Si at 2.0 to 4.0 wt %, Al at 0.01 to 0.04 wt %, S at 0.0004 to 0.002 at %, Mn at 0.05 to 0.3 wt %, N at 0.005 wt % or less (excluding 0 wt %), C at 0.005 wt % or less (excluding 0 wt %), P at 0.005 to 0.15 wt %, Ca at 0.0001 to 0.005 wt %, Mg at 0.0001 to 0.005 wt %, Sb at 0.001 to 0.1 wt %, and the balance including Fe and other impurities unavoidably added thereto.

The double oriented electrical steel sheet according to the embodiment of the present invention may further include one or more of Ti at 0.01 wt % or less, Mo at 0.01 wt % or less, Bi at 0.01 wt % or less, Pb at 0.01 wt % or less, As at 0.01 wt % or less, Be at 0.01 wt % or less, and Sr at 0.01 wt % or less.

The titanium (Ti) is an element for forming composite precipitates such as a TiSiCN or forming an oxide, and it is preferable to be added in an amount of 0.01 wt % or less. Further, the precipitates and the oxide that are stable at a high temperature hinder the secondary recrystallization, so it is needed to set the added content to be 0.01 wt % or less. However, it is very difficult to completely remove the same in a typical steelmaking process. More specifically, Ti may be contained in an amount of 0.005 wt % or less.

The molybdenum (Mo) has an effect of suppressing intergranular embrittlement by Si on an electrical steel sheet when it is added to the boundary as an element, but it is combined with C to form precipitates such as a carbide of Mo and give a bad influence to magnetism, so it is needed to be limited to 0.01 wt % or less.

The bismuth (Bi), the lead (Pb), the magnesium (Mg), the arsenic (As), the beryllium (Be), and the strontium (Sr) are elements with which an oxide, a nitride, and a carbide are finely formed in the steel, and they support secondary recrystallization, so they may be added. However, when added in excess of 0.01 wt %, a drawback that formation of secondary recrystallization becomes unstable is generated, so the added amount needs to be limited.

Further, regarding the double oriented electrical steel sheet according to the present invention, the remainder excluding the above-noted components includes Fe and unavoidable impurities. However, within the range that does not deteriorate the working effect of the present invention, inclusion of other elements is not excluded.

As described above, the double oriented electrical steel sheet according to the embodiment of the present invention precisely controls the alloying composition to form a plurality of cube texture pieces. Specifically, an area fraction of crystal grains with the orientation within 15° may be 60 to 99% from {100}<001>. In this case, exceeding 99% signifies suppressing of island grains that are inevitably formed during the secondary recrystallization and completely removing of precipitates, and for this purpose, it is limited to be 60 to 99% as an annealing time at a high temperature substantially increases.

In the embodiment of the present invention, a grain size of the electrical steel sheet may exceed 20 times a thickness thereof. The present invention uses the secondary recrystallization, and it is advantageous to obtain a desired orientation when the grain size of the secondary recrystallization exceeds 20 times the thickness of the sheet. The grain size may be measured based on a surface parallel to a rolled surface (ND surface) of the steel sheet, and it means, by assuming an imaginary circle with the same area as the grain, a diameter of the circle.

FIG. 1 illustrates a schematic view of a cross-section of a double oriented electrical steel sheet 100 according to an embodiment of the present invention.

As shown in FIG. 1, an oxide layer 11 formed in an inside direction of a substrate 10 from a surface of the substrate 10 of the steel sheet, and an insulating layer 30 formed on the surface of the steel sheet, may be included. In this case, the surface of the substrate 10 of the steel sheet may mean one surface or both surfaces (upper and lower surfaces) of the steel sheet.

The oxide layer 11 is formed by penetration of oxygen into the substrate. Specifically, it may contain 10 wt % or more of oxygen (O) in addition to the above-described steel sheet composition. Based on the content of oxygen, the substrate 10 and the oxide layer 11 are distinguishable. The oxide layer 11 may be present in a thickness of 5 μm or less. When the oxide layer 11 is too thick, growth of the cube grain is suppressed by an oxygen fraction in the steel, so that a cube fraction is lowered, and the magnetism ultimately deteriorates. More specifically, the thickness of the oxide layer 11 may be 0.01 to 2.5 μm.

The insulating layer 30 may be formed on the surface of the substrate 10. The insulating layer 30 helps to secure insulation. The insulating layer 30 may be formed of an organic or inorganic coating composition, and in some cases, it may be formed of an organic/inorganic composite coating composition. A thickness of the insulating layer 30 may be 0.2 to 8 μm. When the thickness thereof is too thin, it is difficult to meet required insulation characteristics. When the thickness thereof is too thick, magnetization is not easily formed because movement of a magnetic domain becomes difficult during surface magnetization, and thus the magnetism may ultimately deteriorate. When the insulating layer 30 is formed on both surfaces of the substrate 10, each of the insulating layers 30 formed on both surfaces thereof may satisfy the above-described thickness range. More specifically, the thickness of the insulating layer 30 may be 0.4 to 5 μm.

Figure 2:
FIG. 2 illustrates a schematic view of a cross-section of a double oriented electrical steel sheet according to another embodiment of the present invention.

FIG. 2 illustrates a schematic view of a cross-section of a double oriented electrical steel sheet 100 according to another embodiment of the present invention. As shown in FIG. 2, an embodiment of the present invention may further include a forsterite layer 20 interposed between the surface of the substrate 10 and the insulating layer 30. in the oriented electrical steel sheet, in order to provide tension in the rolling direction, an oxide layer containing forsterite ($Mg_2SiO_4$) is formed at a thickness of 2 to 3 μm from a surface thereof, and the tension is provided by using a difference between thermal expansion coefficients of the oxide layer and the substrate. However, in the embodiment of the present invention, the tension in the rolling direction means compression in the transverse direction, so it is desirable to maximally reduce it. Since the thin forsterite layer 20 within 2.0 μm has a very low tension providing effect, such a thin forsterite layer 20 can be formed to remove the tension that is entirely applied to the sheet. The forsterite layer 20 is formed of an annealing separating agent applied before the secondary-recrystallization-annealing. The annealing separating agent contains MgO as a main component, and since it is widely known, a detailed description thereof will be omitted.

After the secondary-recrystallization-annealing, the forsterite layer 20 may be removed, and in this case, as shown in FIG. 1, the insulating layer 30 may be directly formed on the surface of the substrate 10.

The double oriented electrical steel sheet according to the embodiment of the present invention has excellent magnetism in both the rolling direction and the transverse direction. In detail, Br in the rolling direction and the transverse direction are equal to or larger than 1.63 T, the Br in the circumferential direction is equal to or larger than 1.56 T, and the Br is calculated by Formula 2.

$$Br=7.87/(7.87\ 0.065\times[Si]-0.1105\times[Al])\times B8 \quad \text{[Formula 2]}$$

(In Formula 2, [Si] and [Al] are contents (wt %) of Si and Al, respectively, and B8 is intensity (Tesla) of a magnetic field induced at 800 A/m.)

In the case of a large generator, a diameter of a cyclic frame is several meters, and the cyclic frame is formed by cutting the electrical steel sheet with T-shaped teeth. Here, the T-shaped teeth portion is set in the transverse direction, and the rolling direction may be provided in a cyclic frame, or on the contrary, the T-shaped teeth portion may be set in the rolling direction, and the transverse direction may be provided in a cyclic frame. The change of design is determined by a length of the teeth, a diameter length of the cyclic frame, and a width of the cyclic frame. The conventional teeth portion represents a portion where a magnetic flux flows when the generator is driven, and the magnetic flux is discharged to the cyclic portion. In consideration of energy generated at this moment, it is determined whether the rolling direction and the transverse direction are set to be the teeth portion or the cyclic portion, and when the Br is a material with a very high magnetic flux density of 1.63 T or more, it has very high energy efficiency in any case without a need to distinguish to which portion the rolling direction and the transverse direction are used. Further, when the magnetic flux density of the Br in the circumferential direction becomes high enough to be equal to or larger than 1.56 T, the energy loss caused by the magnetic flux on the T-shaped teeth portion and a connection portion of the cyclic frame is largely reduced. By this, efficiency of the generator may be improved, or a generator with high efficiency may be produced with a small core by reducing the width of the cyclic frame and the size of the teeth portion.

The value of Br measured after annealing the electrical steel sheet for 1 to 2 hours at the temperature of 750° C. to 880° C. may be 1.65 T or more.

$$Br=7.87/(7.87\ 0.065\times[Si]-0.1105\times[Al])\times B8 \quad \text{[Formula 2]}$$

(In Formula 2, [Si] and [Al] are contents (wt %) of Si and Al, respectively, and B8 is intensity (Tesla) of a magnetic field induced at 800 A/m.)

A manufacturing method of a double oriented electrical steel sheet according to an embodiment of the present invention includes: manufacturing a slab including Si at 2.0 to 4.0 wt %, Al at 0.01 to 0.04 wt %, S at 0.0004 to 0.002 at %, Mn at 0.05 to 0.3 wt %, N at 0.02 wt % or less (excluding 0 wt %), C at 0.05 wt % or less (excluding 0 wt %), P at 0.005 to 0.15 wt %, Ca at 0.0001 to 0.005 wt %, Mg at 0.0001 to 0.005 wt %, Sb at 0.001 to 0.1 wt %, and the balance including Fe and other impurities unavoidably added thereto; manufacturing a hot-rolled steel sheet by hot rolling the slab; manufacturing a cold-rolled steel sheet by cold rolling the hot-rolled steel sheet; primary-recrystallization-annealing the cold-rolled steel sheet; and secondary-recrystallization-annealing the cold-rolled steel sheet that is primary-recrystallization-annealed.

Hereinafter, the respective steps will be specifically described.

First, the slab is manufactured. A reason for limiting an adding ratio of respective compositions in the slab corresponds to the reason for limiting the compositions of the double oriented electrical steel sheet, so no repeated descriptions will be provided. In a manufacturing process of hot rolling, hot-rolled steel sheet annealing, cold rolling, primary-recrystallization-annealing, and secondary-recrystallization-annealing to be described, the composition of the slab other than C and N is not substantially changed, so the composition of the slab substantially corresponds to the composition of the double oriented electrical steel sheet.

The slab may satisfy Formula 3.

$$[C]/[Si]\geq 0.0067 \quad \text{[Formula 3]}$$

(In Formula 3, [C] and [Si] are contents (wt %) of C and Si in the slab, respectively.)

When a very small amount of C is contained or a very large amount of Si is contained, it may become difficult to promote growth of cubes and suppress growth of Goss. Specifically, the left side of Formula 3 may be 0.0083 or more.

The slab may be manufactured by using a thin slab method or a strip casting method. A thickness of the slab may be 200 to 300 mm. The slab may be heated as needed.

Next, the hot-rolled steel sheet is manufactured by hot rolling the slab.

The manufacturing of the hot-rolled sheet includes rough-rolling the slab, heating the rough-rolled bar, and strip milling the heated bar, and the heating may be maintained at a temperature of 1100° C. or higher for 0.5 to 20 minutes. When it is maintained for less than 0.5 minutes, the grain size of the hot-rolled sheet may not be properly secured, and a uniform fine structure may not be obtained for subsequent rolling. On the other hand, when it is maintained for more than 10 minutes, the surface thereof and oxygen in the atmosphere react to form an oxide layer, so that fine sulfides are not formed by reaction with Mg or Ca, and MgO or CaO may be generated inside the bar close to the surface, thereby properly securing magnetism in the transverse direction.

A finishing temperature of the hot rolling may be 950° C. or lower. The grains with the elongated cube orientation in the hot-rolled steel sheet store much more energy by the lowness of the hot rolling finishing temperature, and thus, the cube fraction may be increased during annealing of the hot-rolled steel sheet.

A thickness of the hot-rolled steel sheet may be 1 to 2 mm.

From the manufacturing of the slab to the manufacturing of the hot-rolled steel sheet, the time at 1100° C. or higher may be within 10 minutes.

After the manufacturing of the hot-rolled steel sheet, a step of annealing the hot-rolled steel sheet may be further included.

An annealing temperature in the annealing of the hot-rolled steel sheet may be 1000 to 1200° C.

Next, the hot-rolled steel sheet is cold-rolled to manufacture a cold-rolled steel sheet. In the manufacturing of the cold-rolled steel sheet, the reduction ratio may be 50 to 70%. When the reduction ratio is very high, a plurality of GOSS crystals are formed. When the reduction ratio is very low, the finally manufactured steel sheet becomes thick.

The primary-recrystallization-annealing may include a step of decarburizing at a dew point temperature of 50 to 70° C. When carbon is contained in a large amount even after the secondary-recrystallization-annealing, it may cause self-aging to largely increase iron loss, so that some of the carbon may be removed through decarburizing during the primary-recrystallization-annealing. It may be performed at a dew point temperature of 50° C. to 70° C. and in a mixed atmosphere of hydrogen and nitrogen.

In the primary-recrystallization-annealing, a nitriding amount may be 0.01 to 0.03 wt %. When the nitriding amount is not appropriately secured, the secondary recrystallization is not smoothly formed, so the magnetism may be deteriorated.

The decarburizing and the nitriding may be simultaneously or sequentially performed. When they are sequentially performed, the nitriding may be performed after the decarburizing, or the decarburizing may be performed after the nitriding.

After the primary-recrystallization-annealing, the average grain size of the steel sheet having undergone the primary-recrystallization-annealing may be 30 to 50 μm. When the average grain size of the steel sheet having undergone the primary-recrystallization-annealing is not appropriately secured, the secondary recrystallization is not smoothly formed, so the magnetism may be deteriorated.

The primary-recrystallization-annealing may be performed in a temperature range of 800 to 900° C.

After the primary-recrystallization-annealing, applying an annealing separator including MgO may be further included.

The forsterite layer formed by applying an annealing separator is the same as that described above, so a repeated description thereof will be omitted.

The secondary-recrystallization-annealing causes the secondary recrystallization of the {100}<001> cube orientation by raising a temperature at an appropriate raising rate, and it undergoes purification annealing, which is a process of removing impurities, and then cooled. In the process, an annealing atmosphere gas is heat-treated by using a mixed gas of hydrogen and nitrogen during the temperature raising process as in the general case, and 100% hydrogen gas is used in the purification annealing for a long time to remove impurities. A temperature of the secondary-recrystallization-annealing may be 1000 to 1300° C., and a time thereof may be 10 to 25 hours.

In the embodiment of the present invention, it may be advantageous that the forsterite layer is thin or is removed, as described above. Therefore, after the secondary-recrystallization-annealing, removing the forsterite layer formed on the surface of the steel sheet may be further included. In the removing, a physical or chemical removing method may be used.

Hereinafter, preferred examples of the present invention and comparative examples will be described. However, the following examples are only preferred examples of the present invention, and the present invention is not limited to the following examples.

Experimental Example 1

A slab including the components shown in Table 1 and Table 2, the balance, and inevitable impurities was manufactured, heated at 1200° C., and hot-rolled to manufacture a hot-rolled coil with a thickness of 1.4 mm. It was maintained at 1100° C. for 3 minutes during the hot rolling. Then, after annealing at 1100° C. to 1140° C. for 30 seconds and annealing at 900° C. for 90 seconds, the rapidly cooled hot-rolled annealing steel sheet was cold-rolled up to reduction ratio of 63%.

The cold-rolled steel sheet was nitrided at 0.02 wt %, and simultaneously subjected to the primary-recrystallization-annealing process of decarburizing in an atmosphere of a dew point of 60° C. and hydrogen at 75 vol % to make the grain size 36 μm. Then, after applying the annealing separator containing the MgO component, the temperature was raised to 1200° C. at a heating speed of 20° C. per hour, and then the secondary-recrystallization-annealing was performed for 20 hours. After removing the MgO annealing separator from the cooled steel sheet, insulating coating to a 0.4 μm thickness was performed on the upper and lower surfaces of the cooled steel sheet, and the magnetism was measured and is summarized in Table 3. Table 3 shows the results of re-measurement of magnetism after annealing at 800° C. for 2 hours after the magnetism measurement.

TABLE 1

| Specimen (wt %) | Si | Al | S | Mn | Slab N | Slab C | N after secondary-recrystallization-annealing | C after secondary-recrystallization-annealing |
|---|---|---|---|---|---|---|---|---|
| A1 | 2.69 | 0.028 | 0.0005 | 0.13 | 0.0056 | 0.019 | 0.0028 | 0.001 |
| A2 | 2.77 | 0.028 | 0.0005 | 0.13 | 0.0043 | 0.023 | 0.0027 | 0.001 |
| A3 | 2.53 | 0.029 | 0.0005 | 0.13 | 0.0056 | 0.025 | 0.0028 | 0.001 |
| A4 | 2.65 | 0.028 | 0.0005 | 0.13 | 0.0034 | 0.028 | 0.0029 | 0.001 |
| A5 | 2.79 | 0.028 | 0.0005 | 0.08 | 0.0013 | 0.03 | 0.0028 | 0.001 |
| A6 | 2.74 | 0.028 | 0.0008 | 0.19 | 0.0054 | 0.033 | 0.0029 | 0.0035 |
| A7 | 2.71 | 0.028 | 0.0008 | 0.06 | 0.0048 | 0.023 | 0.0029 | 0.001 |
| A8 | 2.75 | 0.033 | 0.0008 | 0.26 | 0.0097 | 0.026 | 0.0029 | 0.001 |
| A9 | 2.63 | 0.015 | 0.0008 | 0.149 | 0.0034 | 0.028 | 0.0029 | 0.001 |
| A10 | 2.36 | 0.029 | 0.0015 | 0.149 | 0.0054 | 0.027 | 0.003 | 0.001 |
| A11 | 3 | 0.027 | 0.0011 | 0.15 | 0.0021 | 0.028 | 0.0029 | 0.001 |
| A12 | 2.64 | 0.027 | 0.001 | 0.142 | 0.0051 | 0.036 | 0.003 | 0.001 |
| A13 | 2.78 | 0.026 | 0.0018 | 0.137 | 0.0038 | 0.033 | 0.003 | 0.001 |
| A14 | 2.64 | 0.029 | 0.0008 | 0.021 | 0.0065 | 0.023 | 0.0028 | 0.001 |
| A15 | 2.77 | 0.027 | 0.0047 | 0.06 | 0.0054 | 0.024 | 0.0028 | 0.001 |
| A16 | 2.53 | 0.026 | 0.0005 | 0.14 | 0.0067 | 0.008 | 0.0028 | 0.001 |
| A17 | 2.6 | 0.028 | 0.0009 | 0.51 | 0.0029 | 0.08 | 0.0029 | 0.0065 |
| A18 | 2.8 | 0.028 | 0.0009 | 0.135 | 0.0028 | 0.023 | 0.0028 | 0.001 |
| A19 | 2.72 | 0.008 | 0.001 | 0.147 | 0.0034 | 0.025 | 0.0027 | 0.001 |
| A20 | 1.83 | 0.028 | 0.001 | 0.148 | 0.0065 | 0.024 | 0.0028 | 0.001 |
| A21 | 2.65 | 0.028 | 0.001 | 0.147 | 0.0029 | 0.061 | 0.0029 | 0.003 |
| A22 | 2.79 | 0.026 | 0.001 | 0.139 | 0.0054 | 0.024 | 0.0029 | 0.001 |
| A23 | 2.31 | 0.026 | 0.001 | 0.149 | 0.0065 | 0.025 | 0.0029 | 0.001 |
| A24 | 2.77 | 0.026 | 0.0009 | 0.149 | 0.003 | 0.024 | 0.003 | 0.001 |
| A25 | 2.81 | 0.028 | 0.0006 | 0.135 | 0.0053 | 0.019 | 0.0028 | 0.001 |

TABLE 2

| Specimen (wt %) | Ti | P | [C]/[Si] | [Ca] + [Mg] − [S] | Ca | Mg | Sn | Sb |
|---|---|---|---|---|---|---|---|---|
| A1 | 0.002 | 0.035 | 0.0071 | 0.0047 | 0.0043 | 0.0009 | 0.005 | 0.005 |
| A2 | 0.002 | 0.035 | 0.0083 | 0.0016 | 0.0012 | 0.0009 | 0.05 | 0.005 |
| A3 | 0.002 | 0.035 | 0.0099 | 0.0017 | 0.0013 | 0.0009 | 0.005 | 0.03 |
| A4 | 0.002 | 0.035 | 0.0106 | 0.0015 | 0.0011 | 0.0009 | 0.05 | 0.03 |
| A5 | 0.002 | 0.035 | 0.0108 | 0.0055 | 0.004 | 0.002 | 0.005 | 0.005 |
| A6 | 0.002 | 0.035 | 0.012 | 0.0012 | 0.0011 | 0.0009 | 0.005 | 0.005 |
| A7 | 0.002 | 0.035 | 0.0085 | 0.0026 | 0.0023 | 0.0011 | 0.005 | 0.005 |
| A8 | 0.002 | 0.035 | 0.0095 | 0.0042 | 0.003 | 0.002 | 0.005 | 0.005 |
| A9 | 0.002 | 0.035 | 0.0106 | 0.0014 | 0.0013 | 0.0009 | 0.005 | 0.005 |
| A10 | 0.002 | 0.035 | 0.0114 | 0.001 | 0.0015 | 0.001 | 0.005 | 0.005 |
| A11 | 0.002 | 0.035 | 0.0093 | 0.0016 | 0.0016 | 0.0011 | 0.005 | 0.005 |
| A12 | 0.002 | 0.035 | 0.0136 | 0.0011 | 0.0012 | 0.0009 | 0.005 | 0.005 |
| A13 | 0.002 | 0.035 | 0.0119 | 0.0013 | 0.0017 | 0.0014 | 0.005 | 0.005 |
| A14 | 0.014 | 0.035 | 0.0087 | 0.0027 | 0.00005 | 0.0034 | 0.005 | 0.005 |
| A15 | 0.002 | 0.035 | 0.0087 | −0.0042 | 0.00005 | 0.0005 | 0.005 | 0.005 |
| A16 | 0.002 | 0.035 | 0.0032 | 0.0001 | 0.00005 | 0.0005 | 0.005 | 0.005 |
| A17 | 0.002 | 0.035 | 0.0308 | 0.0019 | 0.0003 | 0.0025 | 0.005 | 0.005 |
| A18 | 0.002 | 0.035 | 0.0082 | −0.0004 | 0.00005 | 0.0005 | 0.005 | 0.005 |
| A19 | 0.002 | 0.035 | 0.0092 | −0.0005 | 0.00005 | 0.0005 | 0.005 | 0.005 |
| A20 | 0.002 | 0.035 | 0.0131 | −0.0005 | 0.00005 | 0.0005 | 0.005 | 0.005 |
| A21 | 0.002 | 0.035 | 0.023 | 0.0071 | 0.00005 | 0.008 | 0.005 | 0.005 |
| A22 | 0.002 | 0.035 | 0.0086 | −0.0005 | 0.00005 | 0.0005 | 0.005 | 0.005 |
| A23 | 0.002 | 0.16 | 0.0108 | 0.0005 | 0.001 | 0.0005 | 0.005 | 0.005 |
| A24 | 0.011 | 0.035 | 0.0087 | 0.0076 | 0.008 | 0.0005 | 0.005 | 0.005 |
| A25 | 0.002 | 0.035 | 0.0068 | 0.00245 | 0.003 | 0.00005 | 0.005 | 0.005 |

TABLE 3

| Specimen | Rolling direction Br (T) | Transverse direction Br (T) | Circumferential direction Br (T) | Epstein after two-hours' annealing Br (T) | Cube fraction within 15 degrees | Average grain size (ratio to thickness) | Remarks |
|---|---|---|---|---|---|---|---|
| A1 | 1.823 | 1.803 | 1.723 | 1.815 | 91 | 86 | Inventive Example |
| A2 | 1.831 | 1.822 | 1.691 | 1.828 | 95 | 151 | Inventive Example |
| A3 | 1.812 | 1.802 | 1.641 | 1.809 | 89 | 72 | Inventive Example |
| A4 | 1.843 | 1.812 | 1.642 | 1.829 | 95 | 160 | Inventive Example |
| A5 | 1.833 | 1.801 | 1.634 | 1.819 | 92 | 98 | Inventive Example |
| A6 | 1.812 | 1.793 | 1.672 | 1.804 | 87 | 64 | Inventive Example |
| A7 | 1.843 | 1.734 | 1.652 | 1.79 | 83 | 48 | Inventive Example |
| A8 | 1.803 | 1.758 | 1.612 | 1.782 | 81 | 42 | Inventive Example |
| A9 | 1.823 | 1.664 | 1.631 | 1.745 | 70 | 26 | Inventive Example |
| A10 | 1.851 | 1.793 | 1.665 | 1.824 | 93 | 120 | Inventive Example |
| A11 | 1.826 | 1.774 | 1.642 | 1.802 | 87 | 60 | Inventive Example |
| A12 | 1.808 | 1.698 | 1.613 | 1.755 | 73 | 34 | Inventive Example |
| A13 | 1.93 | 1.657 | 1.603 | 1.795 | 85 | 52 | Inventive Example |
| A14 | 1.546 | 1.443 | 1.441 | 1.496 | 15 | 9.4 | Comparative example |
| A15 | 1.565 | 1.523 | 1.513 | 1.546 | 10 | 8.9 | Comparative example |
| A16 | 1.82 | 1.339 | 1.328 | 1.581 | 20 | 2 | Comparative example |
| A17 | 1.612 | 1.546 | 1.537 | 1.581 | 20 | 1 | Comparative example |
| A18 | 1.583 | 1.529 | 1.512 | 1.558 | 13 | 3 | Comparative example |
| A19 | 1.534 | 1.483 | 1.472 | 1.51 | 11 | 2 | Comparative example |
| A20 | 1.554 | 1.483 | 1.474 | 1.52 | 2 | 0.2 | Comparative example |
| A21 | 1.583 | 1.446 | 1.439 | 1.516 | 5 | 1 | Comparative example |
| A22 | 1.592 | 1.463 | 1.453 | 1.529 | 5 | 1.2 | Comparative example |
| A23 | 1.535 | 1.383 | 1.388 | 1.46 | 15 | 0.5 | Comparative example |
| A24 | 1.572 | 1.465 | 1.461 | 1.52 | 5 | 8.4 | Comparative example |
| A25 | 1.795 | 1.456 | 1.453 | 1.791 | 10 | 8.3 | Comparative example |

As shown in Table 1 to Table 3, it can be seen that the inventive examples satisfying the alloy composition of the present invention have a large average grain size, a high cube fraction, and excellent magnetism. In contrast, it can be seen that the comparative examples that do not satisfy the alloy composition of the present invention have a small average grain, a low cube fraction, and poor magnetism.

Experimental Example 2

The annealing separator is not removed from the specimen Al of Example 1, and as shown in Table 4, an upper insulating coating and a lower insulating coating are formed, and the magnetism is measured, and is summarized in Table 4.

TABLE 4

| Specimen title | Insulating layer thickness on upper surface of steel sheet (μm) | Insulating layer thickness on lower surface of steel sheet (μm) | Rolling direction Br (T) | Transverse direction Br (T) | Circumferential direction Br (T) | Epstein after two-hours' annealing Br (T) | Remarks |
|---|---|---|---|---|---|---|---|
| B1 | 0.5 | 0.45 | 1.813 | 1.803 | 1.693 | 1.81 | Inventive Example |
| B2 | 0.4 | 0.55 | 1.823 | 1.803 | 1.703 | 1.815 | Inventive Example |

TABLE 4-continued

| Specimen title | Insulating layer thickness on upper surface of steel sheet (μm) | Insulating layer thickness on lower surface of steel sheet (μm) | Rolling direction Br (T) | Transverse direction Br (T) | Circumferential direction Br (T) | Epstein after two-hours' annealing Br (T) | Remarks |
|---|---|---|---|---|---|---|---|
| B3 | 3.5 | 2.1 | 1.803 | 1.8 | 1.693 | 1.803 | Inventive Example |
| B4 | 3.5 | 3.4 | 1.801 | 1.8 | 1.669 | 1.802 | Inventive Example |
| B5 | 10 | 12 | 1.712 | 1.651 | 1.553 | 1.683 | Inventive Example |
| B6 | 10 | 12 | 1.654 | 1.612 | 1.524 | 1.635 | Inventive Example |

As shown in Table 4, it can be seen that B1 to B4, which satisfy the thickness ranges of the upper and lower insulating layers, have excellent magnetism. On the other hand, it can be seen that B5 and B6, which do not satisfy the thickness range of the upper and lower insulating layers, have partially deteriorated magnetism in the transverse direction.

Experimental Example 3

A slab including Si at 2.8 wt %, Al at 0.027 wt %, S at 0.0007 wt %, Mn at 0.15 wt %, N at 0.003 wt %, C at 0.028 wt %, P at 0.04 wt %, Ca at 0.002 wt %, Mg at 0.001 wt %, and the balance Fe and inevitable impurities was prepared. The slab was heated at 1150° C. and then hot-rolled to manufacture a hot-rolled coil having a thickness of 1.4 mm. During the hot rolling, the residence time at 1100° C. or higher was adjusted as shown in Table 5 below. The hot-rolled coil was annealed at 1140° C. for 90 seconds, and then cooled, and the hot-rolled annealing steel sheet was cold-rolled to 63% rolling reduction.

The cold-rolled steel sheet is nitrided at 0.02 wt % to undergo the primary-recrystallization-annealing process for decarburizing in an atmosphere with a dew point of 60° C. and a hydrogen content of 75% so that the grain sizes may be those shown in Table 5. An annealing separator including the component of MgO is applied, the temperature is increased up to 1200° C. at the heating rate of 20° C. per hour, and the secondary-recrystallization-annealing is performed for 20 hours. Insulating coating is performed on the upper and lower surfaces to a thickness of 0.4 μm, magnetism is measured, and results are summarized in Table 8.

As shown in Table 5, it can be confirmed that C1 to C3, which properly secure a residence time at 1100° C. or higher during the hot rolling, have a thickness of an oxide layer that is appropriately formed and have excellent magnetism.

In contrast, it can be confirmed that C4 and C5 having too long residence times at 1100° C. or higher have a thickness of an oxide layer that is too thick and have relatively poor magnetism.

The present invention may be embodied in many different forms, and should not be construed as being limited to the disclosed embodiments. In addition, it will be understood by those skilled in the art that various changes in form and details may be made thereto without departing from the technical spirit and essential features of the present invention. Therefore, it is to be understood that the above-described exemplary embodiments are for illustrative purposes only, and the scope of the present invention is not limited thereto.

| <Description of symbols> | |
|---|---|
| 100: double oriented electrical steel sheet | 10: steel sheet substrate |
| 11: oxide layer | 20: forsterite layer |
| 30: insulating layer | |

The invention claimed is:

1. A double oriented electrical steel sheet, including: in wt %, Si at 2.0 to 4.0 wt %, Al at 0.01 to 0.04 wt %, S at 0.0004 to 0.002 wt %, Mn at 0.05 to 0.3 wt %, N at 0.008 wt % or less (excluding 0 wt %), C at 0.005 wt % or less (excluding

TABLE 5

| Specimen | Time at 1100° C. or more (minutes) | Oxide layer thickness (μm) | Rolling direction Br (T) | Transverse direction Br (T) | Circumferential direction Br (T) | Epstein after two-hours' annealing Br (T) | Cube fraction within 15 degrees | Grain size (ratio to thickness) | Remarks |
|---|---|---|---|---|---|---|---|---|---|
| C1 | 1 | 0.03 | 1.86 | 1.803 | 1.712 | 1.833 | 96 | 67 | Inventive Example |
| C2 | 2 | 2.1 | 1.83 | 1.81 | 1.77 | 1.822 | 93 | 52 | Inventive Example |
| C3 | 5 | 2.3 | 1.831 | 1.82 | 1.74 | 1.827 | 94 | 55 | Inventive Example |
| C4 | 30 | 9 | 1.65 | 1.6 | 1.583 | 1.627 | 6 | 9 | Inventive Example |
| C5 | 120 | 15 | 1.61 | 1.54 | 1.532 | 1.577 | 12 | 9 | Inventive Example |

0 wt %), P at 0.005 to 0.15 wt %, Ca at 0.00010 to 0.005 wt %, Mg at 0.00010 to 0.005 wt %, and the balance including Fe and other impurities unavoidably added thereto, wherein an area fraction of a grain with an orientation within 15° is 60 to 99% from {100}<001>, wherein the double oriented electrical steel sheet satisfies Formula 1:

$$[Ca]+[Mg]\geq[S] \quad \text{[Formula 1]}$$

(in Formula 1, [Ca], [Mg], and [S] represent contents (wt %) of Ca, Mg, and S, respectively).

2. The double oriented electrical steel sheet of claim 1, further comprising one or more of Sb at 0.001 to 0.1 wt % and Sn at 0.001 to 0.1 wt %.

3. The double oriented electrical steel sheet of claim 1, further comprising one or more of Ti at 0.01 wt % or less, Mo at 0.01 wt % or less, Bi at 0.01 wt % or less, Pb at 0.01 wt % or less, Mg at 0.01 wt % or less, As at 0.01 wt % or less, Be at 0.01 wt % or less, and Sr at 0.01 wt % or less.

4. The double oriented electrical steel sheet of claim 1, wherein an average grain size is 20 times or more a thickness of the steel sheet.

5. The double oriented electrical steel sheet of claim 1, wherein the steel sheet comprises an oxide layer formed from a surface of a substrate forming the steel sheet in a direction inside the substrate and an insulating layer formed on the surface of the substrate.

6. The double oriented electrical steel sheet of claim 5, wherein a thickness of the oxide layer is 5 μm or less.

7. The double oriented electrical steel sheet of claim 5, wherein a thickness of the insulating layer is 0.2 to 8 μm.

8. The double oriented electrical steel sheet of claim 5, further comprising a forsterite layer interposed between the surface of the substrate and the insulating layer.

9. The double oriented electrical steel sheet of claim 1, wherein

Br in a rolling direction and Br in a transverse direction are equal to or larger than 1.63 T, Br in a circumferential direction is equal to or larger than 1.56 T, and the Br is calculated by Formula 2:

$$Br=7.87/(7.87-0.065\times[Si]-0.1105\times[Al])\times B8 \quad \text{[Formula 2]}$$

(in Formula 2, [Si] and [Al] are contents (wt %) of Si and Al, respectively, and B8 is intensity (Tesla) of a magnetic field induced at 800 A/m).

10. The double oriented electrical steel sheet of claim 1, wherein a Br value measured after annealing the steel sheet at a temperature of 750° C. to 880° C. for 1 to 2 hours is equal to or larger than 1.65 T, and the Br is calculated by Formula 2:

$$Br=7.87/(7.87-0.065\times[Si]-0.1105\times[Al])\times B8 \quad \text{[Formula 2]}$$

(in Formula 2, [Si] and [Al] are contents (wt %) of Si and Al, respectively, and B8 is intensity (Tesla) of a magnetic field induced at 800 A/m).

* * * * *